United States Patent [19]

Crowley

[11] Patent Number: 5,311,321
[45] Date of Patent: May 10, 1994

[54] LASER VIDEO IMAGING SYSTEM WITH PULSE BACKTRACK AND METHOD

[75] Inventor: Ronald P. Crowley, Salem, Mass.

[73] Assignee: Corporation for Laser Optics Research, Wellesley, Mass.

[21] Appl. No.: 51,721

[22] Filed: Apr. 22, 1993

[51] Int. Cl.$^5$ .............................................. H04N 9/31
[52] U.S. Cl. .................................... 348/760; 348/769; 359/285; 359/305
[58] Field of Search ...................... 358/60, 61, 62, 231, 358/232, 233, 235; 359/285, 298, 305; H04N 9/12, 9/11, 9/18, 9/31

[56] References Cited

U.S. PATENT DOCUMENTS

| | | | |
|---|---|---|---|
| 3,514,534 | 5/1970 | Korpel | 358/235 |
| 4,611,245 | 9/1986 | Trias | 358/60 |
| 4,720,747 | 1/1988 | Crowley | 358/231 |
| 4,833,528 | 5/1989 | Kobayashi | 358/60 |

*Primary Examiner*—James J. Groody
*Assistant Examiner*—Glenton B. Burgess
*Attorney, Agent, or Firm*—Richard P. Crowley

[57] ABSTRACT

An improved, multicolored video imaging system to provide a video image on a projection surface, which system includes a red, blue and green pulsed laser as a light source to provide inlet beams, an acoustic-optical cell to receive the inlet beams, an electrical signal to a sound transducer on the cell to provide a sound-modulated outlet beam; a projection surface to display the multicolored image and a projection system to project the outlet beam onto the projection surface to display the video image. The system includes as an improvement a solid state actuator to move a distance in a 45° direction to backtrack the line of image of the outlet beam and a ramp signal device to provide a ramp signal that is proportional in time to the pulse duration of the input beams when the pulse duration is longer than the pixel propagation time for a line of image to be displayed, thereby minimizing the blurring of the line of image displayed.

19 Claims, 5 Drawing Sheets

Fig. 4

Anisotropic Medium

| | | |
|---|---|---|
| Modulator Active Length | mm | MAL = 18 |
| Velocity | mm/us | V = 617 |

Horizontal Line Time    us      Eq. 1.    $HLT = \dfrac{MAL}{V}$    HLT = 29.173 us Pixel Count      PC = 1280

Pixel Time    ns      Eq. 2.    $PT = \dfrac{HLT}{PC}$    PT = 0.023 us

Ideal Light Pulse    ns    ILP = 20

Pixel Length in Modulator    um      Eq. 3.    $PLM = \dfrac{MAL}{PC}$    PLM = 0.014 mm Focus Factor      FF = 10

M = 1,2..11      Eq. 4.    $BackTrac(M) = \dfrac{(M-1) \cdot PLM}{FF}$ mm

Eq. 5.    $LightPulse(M) = M \cdot PT$ us

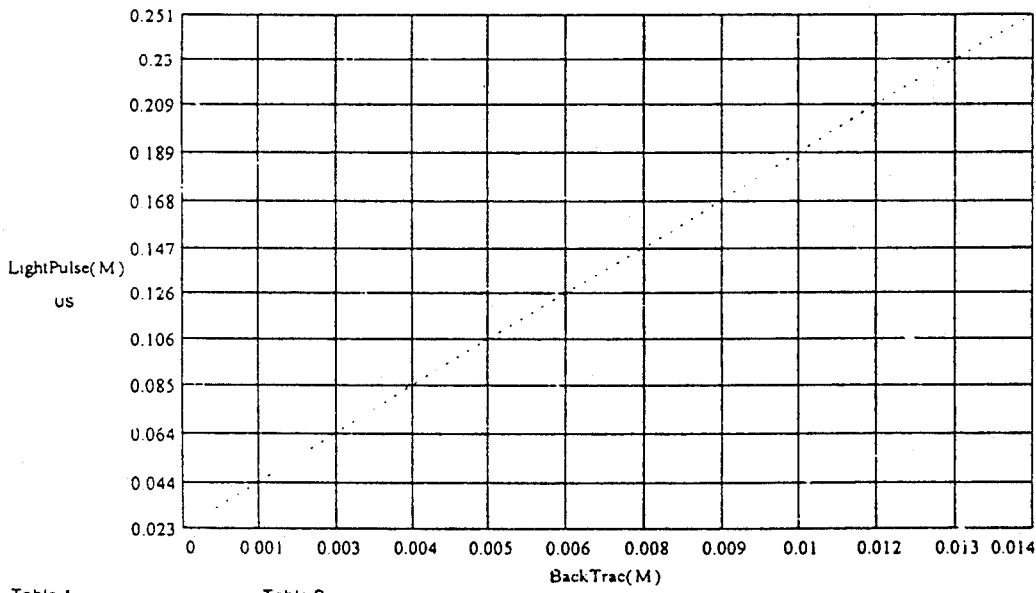

Table 1    BackTrac(M)    Table 2    LightPulse(M)

| BackTrac(M) | LightPulse(M) |
|---|---|
| 0 | 0.023 |
| $1.406 \cdot 10^{-3}$ | 0.046 |
| $2.813 \cdot 10^{-3}$ | 0.068 |
| $4.219 \cdot 10^{-3}$ | 0.091 |
| $5.625 \cdot 10^{-3}$ | 0.114 |
| $7.031 \cdot 10^{-3}$ | 0.137 |
| $8.438 \cdot 10^{-3}$ | 0.16 |
| $9.844 \cdot 10^{-3}$ | 0.182 |
| $1.125 \cdot 10^{-2}$ | 0.205 |
| $1.266 \cdot 10^{-2}$ | 0.228 |
| $1.406 \cdot 10^{-2}$ | 0.251 |

Fig. 5

Isotropic Medium

| | | |
|---|---|---|
| Modulator Active Length | mm | MAL = 39 |
| Velocity | mm/us | V = 3.9 |

Horizontal Line Time  us

Eq. 1.  $HLT = \dfrac{MAL}{V}$   HLT = 10 us

Pixel Count   PC = 1000

Pixel Time  ns

Eq. 2.  $PT = \dfrac{HLT}{PC}$   PT = 0.01 us

Ideal Light Pulse  ns   ILP = 10

Pixel Length in Modulator  um

Eq. 3.  $PLM = \dfrac{MAL}{PC}$   PLM = 0.039 mm

Focus Factor   FF = 10

M = 1, 3 .. 21

Eq. 4.  $BackTrac(M) = \dfrac{(M-1) \cdot PLM}{FF}$ mm

Eq. 5.  $LightPulse(M) = M \cdot PT$ us

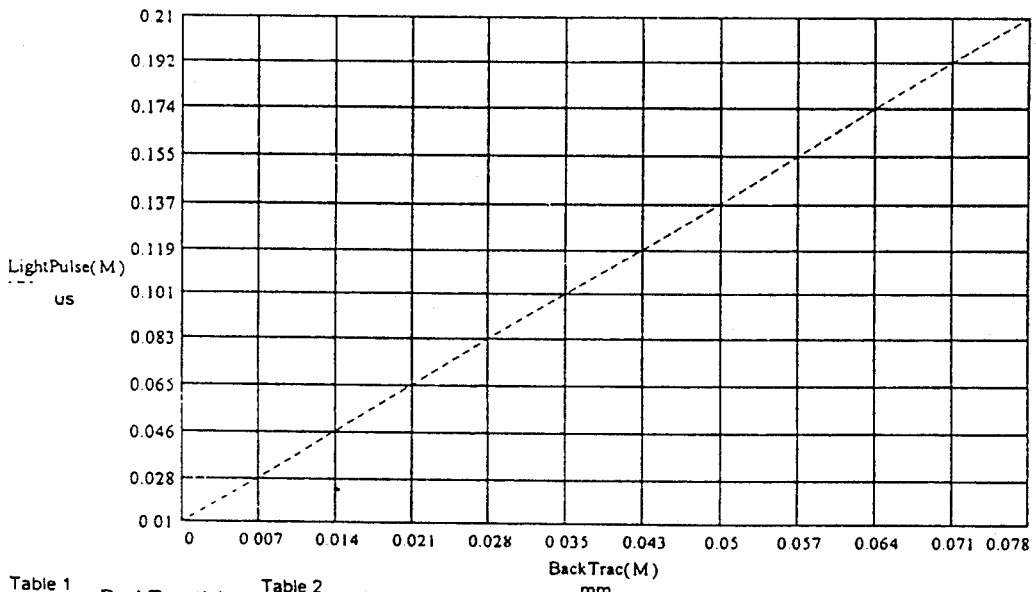

Table 1  BackTrac(M)

| |
|---|
| 0 |
| $7.8 \cdot 10^{-3}$ |
| $1.56 \cdot 10^{-2}$ |
| $2.34 \cdot 10^{-2}$ |
| $3.12 \cdot 10^{-2}$ |
| $3.9 \cdot 10^{-2}$ |
| $4.68 \cdot 10^{-2}$ |
| $5.46 \cdot 10^{-2}$ |
| $6.24 \cdot 10^{-2}$ |
| $7.02 \cdot 10^{-2}$ |
| $7.8 \cdot 10^{-2}$ |

Table 2  LightPulse(M)

| |
|---|
| 0.01 |
| 0.03 |
| 0.05 |
| 0.07 |
| 0.09 |
| 0.11 |
| 0.13 |
| 0.15 |
| 0.17 |
| 0.19 |
| 0.21 |

LASER VIDEO IMAGING SYSTEM WITH PULSE BACKTRACK AND METHOD

BACKGROUND OF THE INVENTION

A pulsed laser video imaging system and method is set forth in U.S. Pat. No. 4,851,918, issued Jul. 25, 1989, hereby incorporated by reference, which system employs one or more pulsed lasers to provide a light input beam. One or more acoustical-optical cells receive the input light beam or beams and one or more transducers on the acoustical cells provides one or more sound modulated output beams. The system includes a signal means to drive the transducers to produce modulated sound waves which correspond with the electrical signal for a line of the video image to be projected. A compression means is employed with the signal means to decrease the time required for the sound waves to enter the acoustical cell so as to reduce the time direction for a signal representing a line of the video imaging system. A sequential plane projector is used to focus the modulated output beam and to illuminate a portion of a projection screen corresponding to each line to provide a video image on the projection screen. Preferably, three metal vapor, pulsed lasers to provide red, green and blue light beams are used to produce a full color video imaging system of high resolution.

It is desirable to provide an improved, particularly a multicolored, video imaging system and method which permits the use of a wider variety of lasers as a light source, such as a pulsed laser light source whose pulse duration is longer than a single pixel time for a line of the image.

SUMMARY OF THE INVENTION

The invention relates to a pulsed laser video imaging system and method. In particular, the invention concerns a multicolored video imaging system and method which employs one or more pulsed lasers with a pulse time duration or pulse width that is longer than the pixel propagation time in the acoustical cell modulator system.

A video imaging system and method is disclosed using multiple monochromatic or multichromatic light sources, modulated by RF signals within an acoustic-optical cell using an isotropic or anisotropic medium for modulation of the input light beams. Preferably, solid state based laser sources which are frequency doubled from the invisible infra-red radiation region to the visible radiation spectral region using nonlinear optical crystals are used as the light sources. Further, one or more of all of the light sources have a pulse width or duration that is longer than the pixel propagation time of the sound waves in the acoustic-optical cell.

The invention relates to a video imaging system to include a multicolored video imaging system which provides a video image on a projection surface, and which comprises a light source means which comprises a pulsed laser to provide a monochromatic light input beam in the visible radiation region, such as a pulsed laser with visible light of red, green and blue; an acoustic-optical cell means, either anisotropic or isotropic, having an inlet face to receive the input beam and an outlet face; an electrical signal-to-sound wave transducer means mounted on a face of the acoustic-optical cell means other than the inlet face and the outlet face to provide a sound modulated light outlet beam from the outlet face; signal means to drive said transducer means to produce sound waves within said cell means modulated to correspond to the electrical signals for a line of the video image; a projection surface means to display on a projection surface a video image; and plane projection means to provide for the projection of the sound modulated outlet beam onto the said projection surface with each line of the video image produced at a different location on the projection surface and in which system the improvement comprises a solid state actuator means, such as a piezoelectric material with a mirror or polished or coated incident face, and responsive to a signal means and adapted to move in a direction 45° to the outlet beam to backtrack the line of the image of the outlet beam in a direction opposite to the direction of the outlet beam from the acoustic-optical cell means; and a signal means to produce a ramp signal that is proportional in time to the pulse duration of the input beam when the pulse duration is longer than the pixel propagation time for a line of image and which ramp signal drives the actuator means to minimize blurring of the video image. The video imaging system may include an angle amplification means to increase the horizontal translation distance of the actuator means.

The invention comprises a method for providing a video image on a projector screen surface, which method comprises providing a light source comprising a pulsed laser to provide a monochromatic light input beam in the visible radiation region; passing the input beam through an acoustic-optical cell means; sound modulating the input beam within said cell means by a sound wave transducer on said cell means; driving said transducer means to produce sound waves within said cell means modulated to correspond to electrical signals for a line of the video image and to provide a sound modulated outlet beam; projecting the outlet beam onto a projection surface to display a video image, with each line of video image produced at a different location on the projection surface to provide a video image, the improvement which comprises providing a light source which produces a pulse duration which is longer than the pixel propagation time of a line of the image; providing an actuator means responsive to a signal means to provide for the horizontal translating of the actuator means and backtracking of the outlet beam; providing an outlet beam reflective means on an incident face of the actuator means to reflect the outlet beam; and providing a ramp signal to the actuator means, the ramp signal in the light pulse intervals of the pulse durations to provide for displacement of the actuator means and the reflective means in a direction 45° to the incident modulated light outlet beam, thereby reducing the blurring of the video image on the projector surface.

Therefore, it has been found that the modulated optical video signal outlet beams must be backtracked to reverse the direction of propagation of the video image, while the laser pulse is active. If the pulse width of the light source and the outlet beam is not shorter than the pixel propagation time in the acoustic-optical modulator (which is needed in order to stop the acoustic propagation motion), there will be a blurring of the video image on the projector screen. It has been discovered that by moving the video image in the opposite direction of the modulator propagation outlet beam responsive to ramp signals, blurring of the line of image can be minimized.

The invention will be described for the purposes of illustration only in connection with certain embodiments; however, it is recognized that various certain modifications, additions and improvements may be made in the illustrated embodiments by those persons skilled in art, all falling within the spirit and scope of the invention.

BRIEF DESCRIPTION OF THE DRAWINGS

FIG. 4 shows equations and tables and the graph diagram based thereon showing the parameters needed in the backtrack controller using an anisotropic medium in the multicolor imaging system of FIG. 1.

FIG. 5 shows equations and tables and the graph diagram based thereon showing the parameters needed in the backtrack controller using an isotropic medium in the multicolor imaging system of FIG. 1.

DESCRIPTION OF THE EMBODIMENTS

Figure 1:
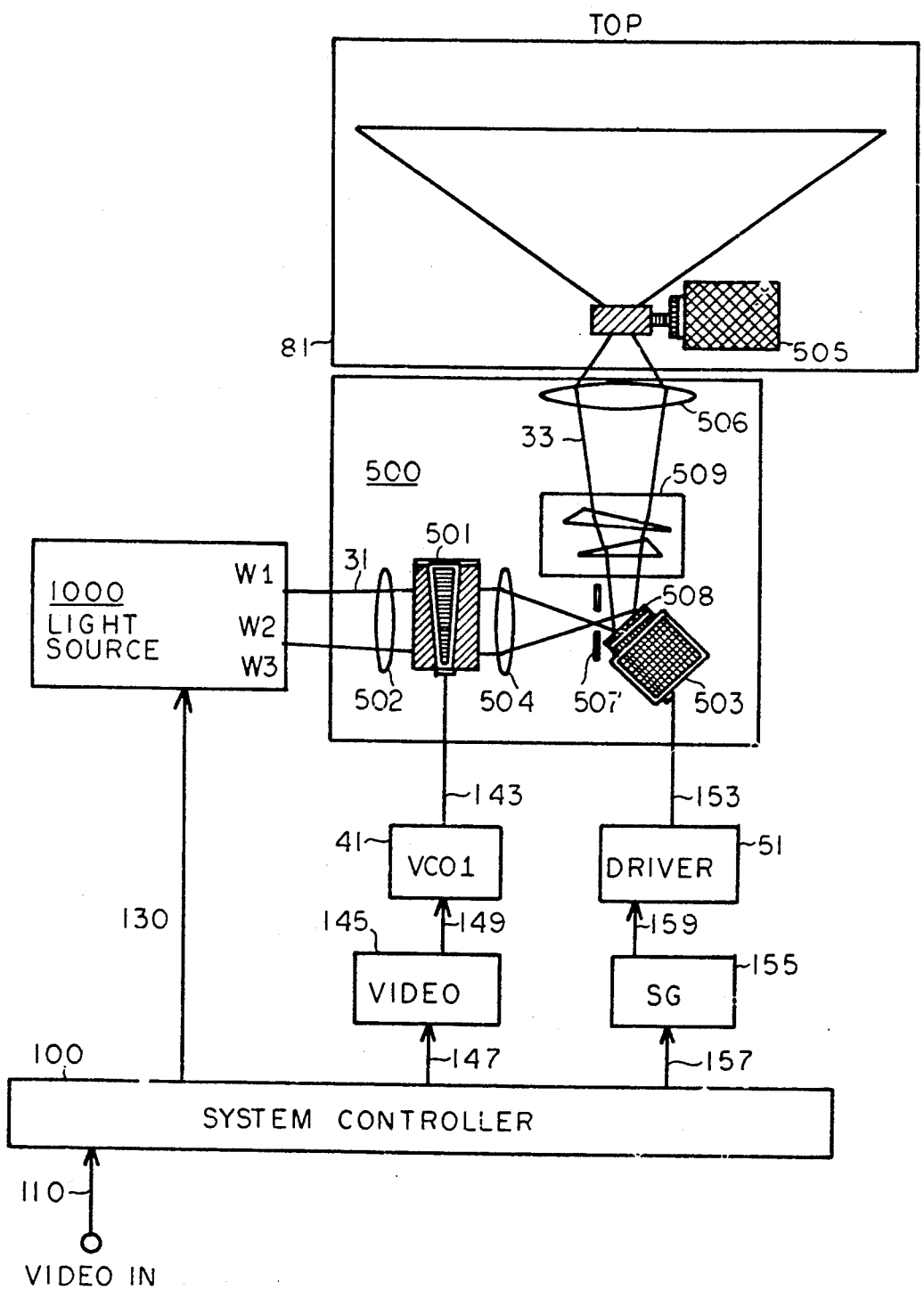
FIG. 1 is a representative schematic diagram of a multicolored video imaging system of the invention.

FIG. 1 is a schematic diagram of a multicolor imaging system of the preferred embodiment of the present invention using an acoustic-optical modulator to modulate the multiple video signals. A backtrack translator means is used to reverse the direction of the optical video signal of the projection system. The backtrack translator means of the embodiment may use either a rotating scanner, a vibrating scanner, a piezoelectric ceramic actuator, a piezoelectric quartz actuator or piezostructive actuator for the projection system. Since the piezo-actuators move in the order of microns, two prisms (wedges) can be used to amplify the translation. Multiwavelength, solid state-based laser systems are the preferred light sources.

Referring to FIG. 1, there is shown a solid state-based laser system 1000 consisting of a frequency doubled infrared pulsed laser. This beam is then incident to a modulation system 500 (see U.S. Pat. No. 4,851,918). FIG. 1 also contains an electronic means 145 for generating the video signal 149 needed to display an image onto the screen 81 of the projection system. Signal 147 drives the video generator 145, while signal 149 amplitude modulates the RF frequency generator 41 in relation to the incoming video picture information. The wavelength w1 is modulated by the acoustic-optical modulator 501 from the RF signal 143. If television video is used, such as NTSC standards, the video information is sampled, such as the compression scheme of U.S. Pat. No. 4,851,918. When the video data of the current horizontal line is within the modulator 501, the light is triggered by signal 130. If the light pulse is shorter or equal to the video pixel time, then the propagation of the video information (which is created inside of the modulator 501) will move no more than the pixel width, which would prevent blurring and appear to stop the picture image at the screen 81. The spacing thickness between pixels can be adjusted by making the light pulse shorter than the pixel time, provided the divergence of the light source permits it.

Lens 502 is used to collimate the diverging beams 31 incident to modulation system 500. Lens 504 focuses the diffracted rays from modulator 501 to a focal spot at optical slit 507. Optical slit 507 blocks the zero order rays and lets the modulated first order diffraction light rays pass to the piezo actuator 503 where the backtracking effect takes place. This happens by translating the actuator 503 forwards and backwards in a direction 451 to the incident light rays 33. The actuator 503 includes a beam reflective means 508 on the actuator beam incident face, such as a mirror, a polished surface or reflective coating. The light rays 33 pass through lens 506 to form a focus on the vertical scanner 505. The lens 506 focuses the light to minimize the size of the scanning mirror mounted to scanner 505 and sets the projection angle of the projector.

Because the light pulse time is longer than the video pixel time, actuator 503 is used to move the video information in the opposite direction of the propagation motion in modulator 501. Scan generator SG 155 generates a ramp signal 159 that is proportional in time to the pulse length of light 31 incident to acoustic-optical modulator 501. Ramp signal 159 is fed to signal driver 51 creating signal 153. This signal will control the amplitude of actuator 503 which backtracks the visual image from exit light 33 at screen 81. The translation minimizes pixel smear, which is generated when the light pulse is longer than the pixel time. The light pulse must be shorter than the pixel time in order to appear to stop the motion of the video image on the screen.

The translation of the piezo actuator 503 is small, on the order of microns, so a means for angle amplification 509 can be incorporated to increase the horizontal translation distance. An amplification scheme 509 which is well known in the art (Watson and Korpel, 1969; Hrbek et al, 1970, 1971) uses and includes a gradient index lens means or a pair of prisms. The diffraction angle is amplified by the first prism and can be rotated to adjust for the magnification factor. In a fixed prism position, the magnification changes as the light is deflected. This causes a misregistration of w1 and w2 images with the w3 image in a multicolored display. This misalignment can be cancelled by using two prisms in cascade as shown.

It should be noted that the angle amplifier 509 could also be replaced by a computer generated holographic lens or plate or may be eliminated in the video imaging system. It further should be noted that the actuator 503 may be either piezoelectric quartz, piezoelectric ceramics, piezostrictive or be replaced by a rotating scanner or a vibrating scanner. Because of the fast velocity requirements, a piezoelectric quartz actuator is the preferred method for translator 503.

System controller 100 coordinates the overall timing from the video in signal 110. This signal generates the timing that controls the backtracking ramp signal 159, the light trigger signal 130 and the video and sync signal 149. The above explanation used only a single pulsed laser monochromatic light source. A multicolor projection can easily be accomplished using two or more light sources and adding acoustic-optical modulators as in U.S. Pat. No. 4,851,918. The light source may comprise three solid state pulsed lasers which comprise a solid state pulsed laser having an infrared light in the range of 1220 nm to 1300 nm and a nonlinear crystal to provide red visible light in the range 610 nm to 650 nm; a solid state pulsed laser having an infrared light in the range of 1020 nm to 1080 nm and a nonlinear crystal to provide green visible light in the range 510 nm to 540 nm; a solid state pulsed laser having an infrared light in the range of 860 nm to 950 nm and a nonlinear crystal to provide red visible light in the range 430 nm to 475 nm, and which solid state pulsed lasers have a light pulse longer than the pixel propagation time of a line of the image.

Figure 2:
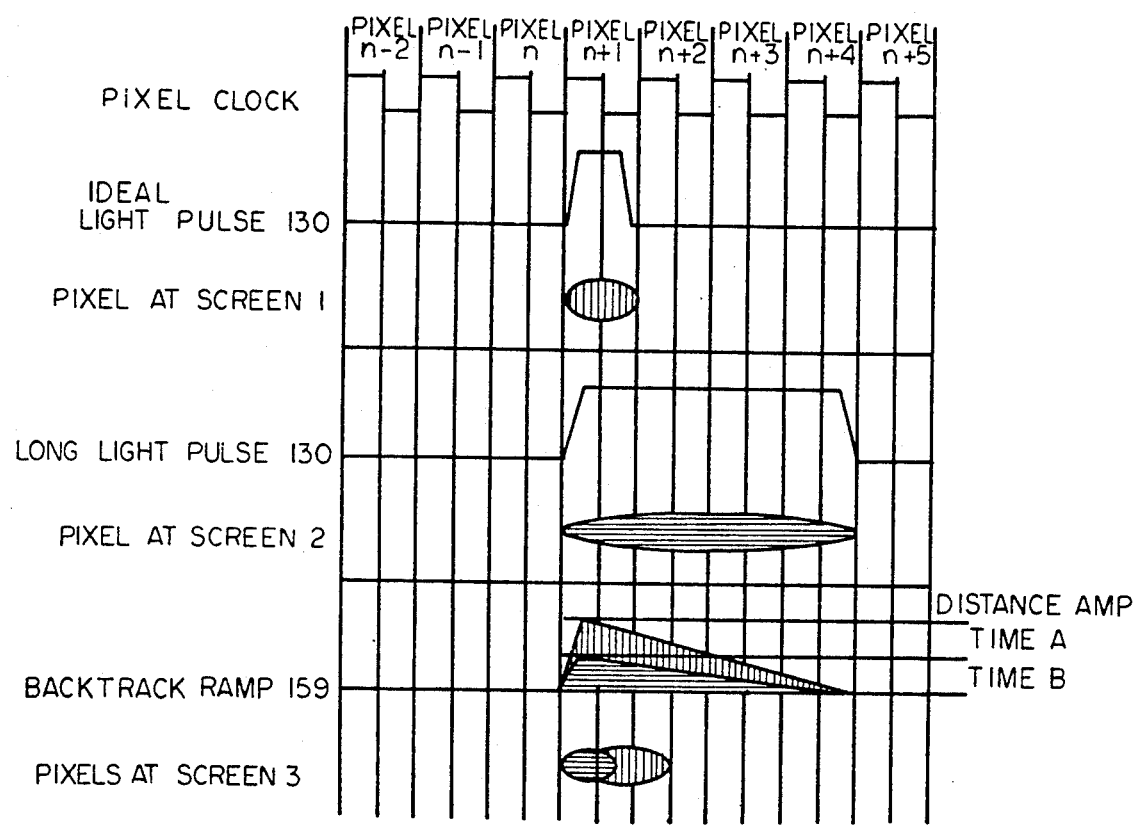
FIG. 2 is a timing diagram showing the timing signals of the backtrack controller and the laser pulse timing used in the multicolor imaging system of FIG. 1.

Referring to FIG. 2, there is shown a timing diagram showing the effects of various light pulse lengths. Referring to the top line labeled "Pixel Clock", this signal shows the timing of the clock that generates the pixels of the electronic video signal 149 as shown in FIG. 1.

The signal labeled "Ideal Light Pulse 130" is shown to detail the ideal light pulse width needed to eliminate pixel smear at the screen 81 in FIG. 1.

The signal labeled "Pixel at Screen 1" shows a slight pixel smear which represents the propagation motion in the acoustic-optical modulator 501 in FIG. 1.

The signal labeled "Long Light Pulse 130" also shown in FIG. 1 of the present invention, illustrates a light pulse width that is four times the ideal light pulse width.

The signal labeled "Pixel At Screen 2" shows how the pixel smears at the screen 81, which represents the propagation motion in the acoustic-optical modulator 501 in FIG. 1. If this smearing is not corrected, then the video picture at the screen 81 in FIG. 1 will be blurry and the video information will not be able to be resolved resulting in poor resolution and image quality.

The signal labeled "BackTrack Ramp 159" is used to generate the signal to move the video image at the screen 81 in the opposite direction as the propagating signal of acoustic-optical modulator 501.

By adding the horizontal actuator 503 and generating the signal labeled "BackTrack Ramp 159", the signal labeled "Pixel At Screen 3" which minimizes pixel smear would be the resulting pixel image at the screen 81. This timing event shows two different distances of travel "Distance Amp." for the actuator 503. "Time a" yields the least pixel smear, but has the longest distance of travel. "Time b" has a greater degree of pixel smear, but since the distance of travel is less (as shown by the amplitude signal), the technology constraints on the light sources or the backtrack actuator are not as stringent.

Figure 3:
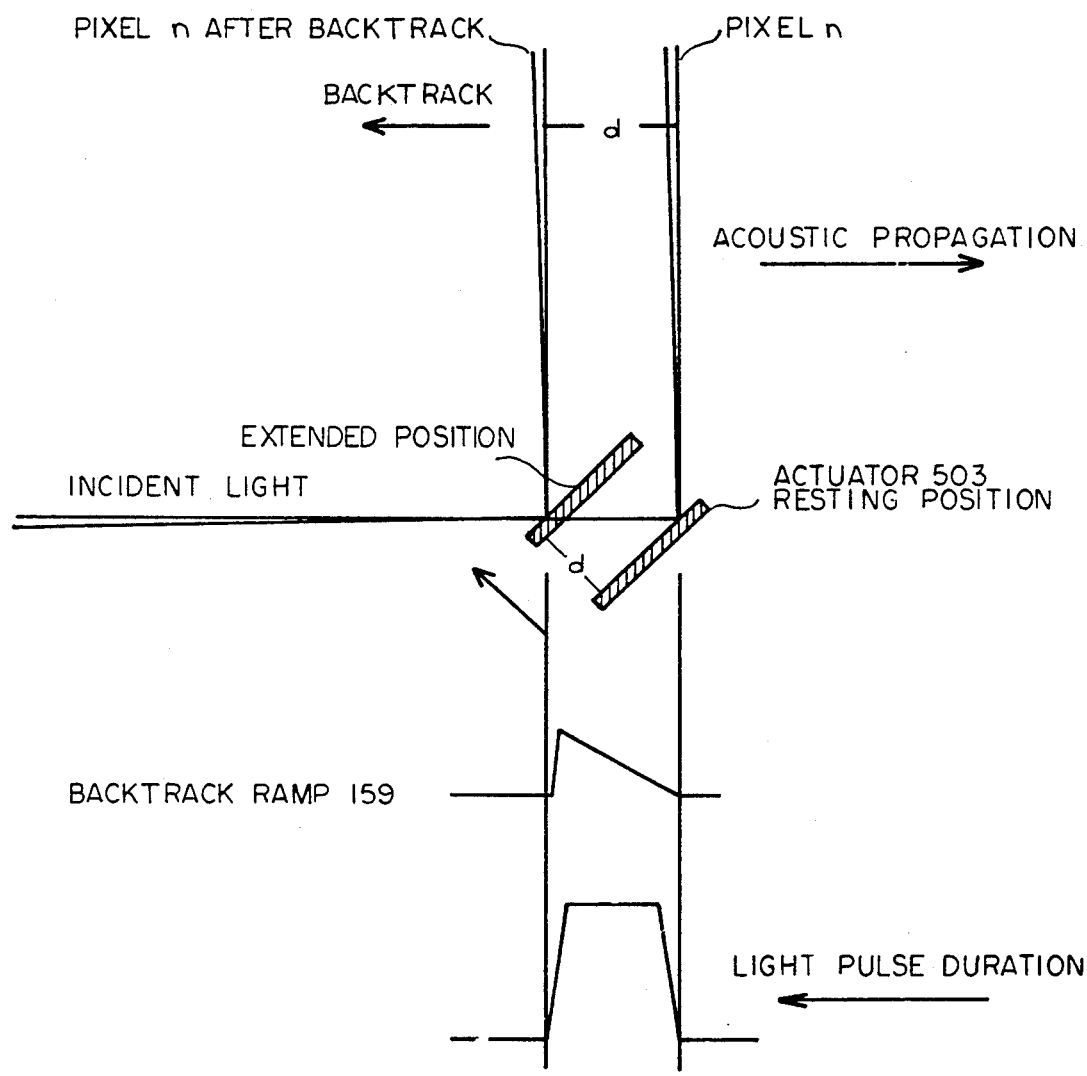
FIG. 3 is a schematic diagram of the physical and timing relationships between the actuator, the incident light, the acoustic propagation, the backtrack ramp and the incident light duration used in the multicolor imaging system of FIG. 1.

FIG. 3 is a diagram showing the relationship between the physical and timing parameters of the backtracking principle. The actuator 503 causes a displacement "d" of the picture image at screen 81. The propagation of "d" shown by the arrow labeled "Backtrack" is moving in the opposite direction as the arrow "Acoustic Propagation". When the "Incident Light" is active as shown by the arrow and signal "Light Pulse Duration", the actuator 503 is displaced by "d" amount from the resting position to the extended position by BackTrack Ramp signal 159. As a result, Pixel n has moved in the reverse direction by displacement "d" as shown by the Pixel n after backtracking.

Referring to FIG. 4, equations are shown to determine how fast to translate and how far to translate the piezo translator 503. This example uses an anisotropic medium, such as TeO$_2$. The first parameter to consider is the interaction length labeled "Modulator Active Length MAL". In this case, it is equal to 18 mm. The next parameter is velocity. This equals 0.617 mm/μs, and from these values the Horizontal Line Time HLT can be found by using Eq. 1, which yield an HLT of 29.173 μs. Using the HLT from above and the Pixel Count PC which is equal to 1280, Eq. 2 will yield the Pixel Time PT, in this case 0.023 μs or 23 ns pixel time. The light pulse has to be less than this value to prevent blurring in the picture image at screen 81. This value can be represented by the Ideal Light Pulse ILP 20 ns, which is less than the stated pixel time of 23 ns PT. Further, the Pixel Length can be determined in the Modulator PLM by Eq. 3. The result is 0.014 mm or 14 μm. The next value needed is the Focus Factor FF. This value redefines the pixel length after it is focused at the optical slit 507. In this example, a FF of 10 is used. Eq. 4 is a function that yields the results in Table 1.

These values represent the distance the actuator has to translate in order to prevent blurring of the picture image at screen 81. Parameter M represents a multiplier used to generate a range of values of BackTrack distances as in Table, 1, using Eq. 4 and long LightPulse times as in Table 2 using Eq. 5. These function tables, Table 1 and Table 2, are used to create the graph showing the relationship between the LightPulse(M), light pulse time in μs, and the BackTrack(M) distance in mm. For example, it can be seen that if a light pulse time of 147 ns is used and there is a FF of 10, then a backtrack distance of 8 μm is needed to prevent the picture image at the screen 81 from blurring. Therefore, because the light pulse is more than six times longer than it is supposed to be, the backtracking minimizes pixel smear on the screen 81.

Referring to FIG. 5, equations are shown to determine how fast to translate and how far to translate the piezo translator 503 shown in FIG. 1. This example uses an isotropic medium, such as glass. The first parameter to consider is the interaction length labeled "Modulator Active Length MAL". In this case, it is equal to 39 mm. The next parameter is velocity. This equals 3.9 mm/μs, and from these values, the Horizonal Line Time HLT can be found by using Eq. 1, which yields an HLT of 10 μs. Using the HLT from above and the Pixel Count PC which is equal to 1000, Eq. 2 will yield the Pixel Time PT. In this case, 0.01 μs or 10 ns pixel time. The light pulse has to be less than this value to prevent blurring in the picture image at screen 81. This value can be represented by the Ideal Light Pulse ILP 10 ns which is the stated pixel time PT. Further, the Pixel Length in the Modulator PLM can be determined by Eq. 3, and the results is 0.039 mm or 39 μm. These values are three times that of anisotropic values. The next value needed is the Focus Factor FF. This value redefines the pixel length after it is focused at the optical slit 507. In this example, a FF of 10 is used. Eq. 4 is a function that yields the results in Table 1. These values represent the distance the actuator has to translate in order to prevent blurring of the picture image at screen 81. Parameter M represents a multiplier used to generate a range of values of BackTrack distances as in Table 1 using Eq. 4 and long LightPulse times as in Table 2 using Eq. 5. These function tables, Table 1 and Table 2, are used to create the graph showing the relationship between the LightPulse(M), light pulse time in μs and the BackTrack(M) distance in mm. For example, if a light pulse time of 192 ns is used and the FF is 10, then a backtrack distance of 71 μm is needed to prevent the picture image at screen 81 from blurring, because the light pulse is more than twenty times longer than it is supposed to be, the backtracking minimizes pixel smear.

As illustrated, the isotropic media has to translate the actuator much farther, and may need the angle amplifier 509 shown in FIG. 1 to accomplish the same with the present state of the art technology. The amount of translation of the actuator means to provide backtracking of the outlet beam may range for example up to about 14 microns more for an anisotropic cell and up to 78 microns or more for an isotropic cell.

Although the video imaging system and method described is most satisfactory and preferred, many variations in structure and method are possible. For example, the source for any color could consist of more than one laser having substantially the same or similar frequency. It should also be understood that the backtracking signal could be of either polarity. If the system is both a front and rear projection device, then the backtracking signal would also have to reverse direction to accommodate both modes.

What is claimed is:

1. In a video imaging system to provide a video image on a projection surface, which system comprises:
   a) a light source means which comprises a pulsed laser to provide a monochromatic light input beam in the visible radiation region;
   b) an acoustic-optical cell means having an inlet face to receive the input beam and out outlet face;
   c) an electrical signal-to-sound wave transducer means mounted on a face of the acoustic-optical cell means other than the inlet face and the outlet face to provide a sound modulated light outlet face;
   d) signal means coupled to above transducer means to produce sound waves within said cell means modulated to correspond to the electrical signals for a line of the video image;
   e) a projection surface means to display on a projection surface a video image; and
   f) plane projection means to provide for the projection of the sound modulated outlet beam onto the said projection surface with each line of the video image produced at a different location on the projection surface, the improvement which comprises:
      i) a solid state actuator means responsive to a ramp signal means and adapted to move a displacement distance in a direction 45° to the outlet beam to backtrack the line of the image of the outlet beam in a direction opposite to the direction of the outlet beam from the acoustic-optical cell means; and
      ii) said ramp signal means to produce a ramp signal that is proportional in time to the pulse duration of the input beam when the pulse duration is longer than the pixel propagation time for a line of image and which ramp signal drives the actuator means to minimize blurring of the line of the video image.

2. The system of claim 1 wherein the light source comprises three frequency doubled, pulsed lasers to provide three monochromatic red, blue and green light input beams for the production of a multicolored video image.

3. The system of claim 1 which includes compression means to decrease the propagation time of the sound waves in said cell means.

4. The system of claim 2 which includes a single acoustic-optical cell means and three separate transducer means mounted on said cell means.

5. The system of claim 2 wherein the actuator means includes a reflective means on the outlet beam receiving incident face of the actuator means to reflect the outlet beam.

6. The system of claim 5 wherein the reflective means comprises a mirrored, coated or polished surface on the incident face.

7. The system of claim 1 wherein the actuator means comprises a piezoelectric actuator.

8. The system of claim 1 which includes an angle amplification means to increase the horizontal translation distance of the actuator means.

9. The system of claim 8 wherein the angle amplification means comprises a first and second prism in a cascade arrangement.

10. The system of claim 8 wherein the angle amplification means comprises a computer generated holographic lens means.

11. The system of claim 8 wherein the angle amplification means comprises a gradient index lens means.

12. The system of claim 1 wherein the light source comprises three solid state pulsed lasers which comprise:
   a) a solid state pulsed laser having an infrared light in the range of 1220 nm to 1300 nm and a nonlinear crystal to provide red visible light in the range 610 nm to 650 nm;
   b) a solid state pulsed laser having an infrared light in the range of 1020 nm to 1080 nm and a nonlinear crystal to provide green visible light in the range 510 nm to 540 nm;
   c) a solid state pulsed laser having an infrared light in the range of 860 nm to 950 nm and a nonlinear crystal to provide blue visible light in the range 430 nm to 475 nm and which solid state pulsed lasers have a light pulse longer than the pixel propagation time of a line of the image.

13. The system of claim 1 wherein the acoustic-optical cell means comprises an anisotropic medium and the actuator means translates a displacement distance of up to about 14 microns.

14. The system of claim 8 wherein the acoustic-optical cell means comprises an isotropic medium and the actuator means translates a displacement distance of up to about 78 microns.

15. In a method for providing a video image on a projector screen surface, which method comprises:
   a) providing a light source comprising a pulsed laser to provide a monochromatic light input beam in the visible radiation region;
   b) passing the input beam through an acoustic-optical cell means;
   c) sound modulating the input beam within said cell means by a sound wave transducer on said cell means;
   d) driving said transducer means to produce sound waves within said cell means modulated to correspond to electrical signals for a line of the video image and to provide a sound modulated outlet beam;
   e) projecting the outlet beam onto a projection surface to display a video image, with each line of video image produced at a different location on the projection surface to provide a video image, the improvement which comprises:
      i) providing a light source which produces a pulse duration which is longer than the pixel propagation time of a line of the image;
      ii) providing an actuator means responsive to a signal means to provide for the horizontal translating of the actuator means and backtracking of the outlet beam;
      iii) providing an outlet beam reflective means on an incident face of the actuator means to reflect the outlet beam; and iv) providing a ramp signal to the actuator means, the ramp signal in the light pulse intervals of the pulse durations to provide for displacement of the actuator means and the reflective means in a direction 45° to the incident modulated light outlet beam to translate the line of image in a direction opposite to the outlet beam, thereby reducing the blurring of the video image on the projector surface.

16. The method of claim 15 which includes amplifying the angle of the outlet beam to increase the horizontal translation of the actuator means and reflective means.

17. The method of claim 15 which includes providing three separate monochromatic pulsed laser input beams of red, blue and green to produce a multicolored video image.

18. The method of claim 15 which includes horizontally moving the actuator means and reflective means thereon a displacement distance of up to about 100 microns.

19. The video image system produced by the method of claim 15.

* * * * *